US011633812B2

(12) United States Patent
Tanaka

(10) Patent No.: US 11,633,812 B2
(45) Date of Patent: Apr. 25, 2023

(54) MACHINE LEARNING DEVICE, LASER MACHINE, AND LASER MACHINING SYSTEM

(71) Applicant: FANUC CORPORATION, Yamanashi (JP)

(72) Inventor: Yousuke Tanaka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 475 days.

(21) Appl. No.: 16/740,987

(22) Filed: Jan. 13, 2020

(65) Prior Publication Data
US 2020/0269359 A1 Aug. 27, 2020

(30) Foreign Application Priority Data
Feb. 26, 2019 (JP) .............................. JP2019-032802

(51) Int. Cl.
*B23K 31/00* (2006.01)
*B23K 26/70* (2014.01)
(Continued)

(52) U.S. Cl.
CPC ............ *B23K 31/006* (2013.01); *B23K 26/03* (2013.01); *B23K 26/04* (2013.01);
(Continued)

(58) Field of Classification Search
CPC ............. B23K 31/006; B23K 26/0821; B23K 26/707; B23K 26/03; B23K 26/04;
(Continued)

(56) References Cited

U.S. PATENT DOCUMENTS

2017/0270434 A1 9/2017 Takigawa et al.

FOREIGN PATENT DOCUMENTS

CN 1585684 A 2/2005
CN 101585111 A 11/2009
(Continued)

OTHER PUBLICATIONS

Notification of Reasons for Refusal dated Jun. 1, 2021 in Japanese Patent Application No. 2019-032802.

*Primary Examiner* — Brian W Jennison
(74) *Attorney, Agent, or Firm* — Wenderoth, Lind & Ponack, L.L.P.

(57) ABSTRACT

A machine learning device performs machine learning on a laser machine including a plurality of galvanometer mirrors for reflection of a laser beam and a plurality of galvanometer motors for driving the galvanometer mirrors to rotate, and scanning the laser beam over a workpiece. The machine learning device includes: input data acquisition unit that acquires at least two detected temperatures from the galvanometer mirrors and the galvanometer motors as input data; label acquisition unit that acquires a coefficient as a label for calculating a machining target position from an actual position of machining with the laser beam on the workpiece; and learning unit that performs supervised learning using a set of the label and the input data as training data to construct a mathematical model for calculating the machining target position from the actual machining position on the workpiece based on the at least two detected temperatures.

6 Claims, 12 Drawing Sheets

(51) Int. Cl.
*B23K 26/082* (2014.01)
*G05B 13/04* (2006.01)
*B23K 26/04* (2014.01)
*G05B 13/02* (2006.01)
*B23K 26/03* (2006.01)

(52) U.S. Cl.
CPC ........ *B23K 26/0821* (2015.10); *B23K 26/707* (2015.10); *G05B 13/027* (2013.01); *G05B 13/042* (2013.01)

(58) Field of Classification Search
CPC .... B23K 26/083; B23K 26/21; B23K 26/032; B23K 26/38; B23K 26/082; B23K 26/342; B23K 26/34; B23K 26/705; B23K 26/0648; B23K 26/0643; B23K 26/0626; B23K 26/0624; B23K 26/00; B23K 26/70; B23K 26/60; B23K 26/40; B23K 26/702; B23K 26/359; B23K 26/382; B23K 26/044; B23K 26/24; B23K 26/0884; B23K 26/046; B23K 26/042; B23K 26/36; B23K 26/0861; B23K 26/0853; B23K 31/125; B23K 37/0235; B23K 37/0408; B23K 26/0869; B23K 26/0876; B23K 37/006; B23K 26/08; B23K 26/0665; B23K 26/034; B23K 26/0006; B23K 31/10; B23K 26/1464; B23K 26/067; B23K 26/123; B23K 26/064; B23K 26/048; B23K 26/1224; B23K 26/125; G05B 13/027; G05B 13/042; G05B 19/40931; G05B 19/404; G05B 13/0265; G05B 19/4155; G05B 19/4097; G05B 19/4093; G05B 23/0283; G05B 19/41875; G05B 19/18; G05B 13/021; G05B 23/024; G05B 23/0243; G05B 23/0281; G05B 19/231; H04N 1/00084; H04N 10/0525; H04N 1/00039; H04N 4/366; H04N 1/00055; H04N 1/60; H04N 1/00832; H04N 1/00344; H04N 1/00068; H04N 1/00061; H04N 1/00023; H01M 4/587; H01M 4/625; C01B 32/05; G06N 3/084; G06N 3/006; G06N 20/00; G06N 5/04; G06N 3/08; G06N 3/0454; G06N 3/086; G06N 3/088; G06N 3/008; G06N 3/0427; B29C 64/268; B29C 64/393; B29C 64/153; B22F 3/105; B22F 3/16; B33Y 10/00; B33Y 30/00; B33Y 50/00; B33Y 50/02; G02B 26/105; G02B 26/101; G02B 26/0816; G02B 26/10; G02B 7/028; G02B 26/12; G01N 25/20; G01N 25/16; H02P 29/60; G06F 30/00; G06F 30/02; G09B 19/24; G01B 11/30; G01B 21/04; B25J 9/1671; B25J 9/161; G06T 7/0004; G06T 7/001; B23Q 11/0007; B23Q 15/12; B23Q 15/18; H01S 5/042; H01S 5/02423; H01S 5/0021; H01S 3/00; H01S 5/0683; H04L 67/10; G03F 7/0037; G01J 1/4257; A47B 47/0091; A47B 57/545; A47B 96/1441; A47B 47/0083; A47B 57/34; A47B 96/021; A47B 57/265; B41J 2/471

See application file for complete search history.

(56) References Cited

FOREIGN PATENT DOCUMENTS

| | | | |
|---|---|---|---|
| CN | 103128439 | A | 6/2013 |
| JP | 2003-290944 | | 10/2003 |
| JP | 2005-292322 | | 10/2005 |
| JP | 2007-21507 | | 2/2007 |
| JP | 2007021507 | A * | 2/2007 |
| JP | 2017-164801 | | 9/2017 |
| JP | 2017-201509 | | 11/2017 |
| JP | 2018-161676 | | 10/2018 |
| JP | 2018161676 | A * | 10/2018 |

* cited by examiner

FIG. 7

$$\begin{bmatrix} x'^0_{00}y'^0_{00} & \cdots & x'^0_{00}y'^N_{00} \\ \vdots & \ddots & \vdots \\ x'^0_{(M-1)0}y'^0_{00} & \cdots & x'^N_{(M-1)0}y'^N_{00} \\ \vdots & \ddots & \vdots \\ x'^0_{(M-1)(M-1)}y'^0_{(M-1)(M-1)} & \cdots & x'^N_{(M-1)(M-1)}y'^N_{(M-1)(M-1)} \end{bmatrix} \begin{bmatrix} a_{00} \\ \vdots \\ a_{N0} \\ \vdots \\ a_{NN} \end{bmatrix} = \begin{bmatrix} x_{00} \\ \vdots \\ x_{(M-1)0} \\ \vdots \\ x_{(M-1)(M-1)} \end{bmatrix}$$

$$\begin{bmatrix} x'^0_{00}y'^0_{00} & \cdots & x'^N_{00}y'^N_{00} \\ \vdots & \ddots & \vdots \\ x'^0_{(M-1)0}y'^0_{00} & \cdots & x'^N_{(M-1)0}y'^N_{00} \\ \vdots & \ddots & \vdots \\ x'^0_{(M-1)(M-1)}y'^0_{(M-1)(M-1)} & \cdots & x'^N_{(M-1)(M-1)}y'^N_{(M-1)(M-1)} \end{bmatrix} \begin{bmatrix} b_{00} \\ \vdots \\ b_{N0} \\ \vdots \\ b_{NN} \end{bmatrix} = \begin{bmatrix} y_{00} \\ \vdots \\ y_{(M-1)0} \\ \vdots \\ y_{(M-1)(M-1)} \end{bmatrix}$$

ically known that performs machining by scanning a laser beam over a workpiece in a predetermined direction. For example, patent document 1 discloses a laser machine that performs machining with a laser beam deflected with a galvanometer mirror and focused with an fθ lens. To avoid reduction in machining position accuracy to be caused by change in temperature at the galvanometer mirror or a galvanometer scanner, this laser machine includes: galvanometer temperature detection means for detecting a temperature at the galvanometer mirror; lens temperature detection means for detecting a temperature at the fθ lens; and means for controlling a deflection and displacement motion position of the galvanometer mirror on the basis of the temperatures from the galvanometer temperature detection means and the lens temperature detection means.

MACHINE LEARNING DEVICE, LASER MACHINE, AND LASER MACHINING SYSTEM

This application is based on and claims the benefit of priority from Japanese Patent Application No. 2019-032802, filed on 26 Feb. 2019, the content of which is incorporated herein by reference.

BACKGROUND OF THE INVENTION

Field of the Invention

The present invention relates to a machine learning device, a laser machine, and a laser machining system.

Related Art

There has been a laser machine conventionally known that performs machining by scanning a laser beam over a workpiece in a predetermined direction. For example, patent document 1 discloses a laser machine that performs machining with a laser beam deflected with a galvanometer mirror and focused with an fθ lens. To avoid reduction in machining position accuracy to be caused by change in temperature at the galvanometer mirror or a galvanometer scanner, this laser machine includes: galvanometer temperature detection means for detecting a temperature at the galvanometer mirror; lens temperature detection means for detecting a temperature at the fθ lens; and means for controlling a deflection and displacement motion position of the galvanometer mirror on the basis of the temperatures from the galvanometer temperature detection means and the lens temperature detection means.

Patent document 2 discloses a controller for a galvanometer scanner including control means for operating an actuator for a mirror on the basis of deviation between a target value and a current value and controlling an output angle of a beam input to the mirror. To allow implementation of machining with excellent accuracy even on the occurrence of thermal deformation of an oscillation axis, this controller for the galvanometer scanner includes: means for storing a relationship between a current value to be supplied to the actuator and a deviation value; and means for estimating the deviation value from the current value to be supplied to the actuator. The control means estimates the deviation value on the basis of the current value during machining, and compensates for the target value so as to cancel the estimated deviation value.

Patent document 3 discloses a laser machine that performs laser machining on a machining target while controlling a galvanometer reflection mirror and controlling a machining position on the machining target. To compensate for position error of the laser machining correctly and allow high-accurate machining on the machining target using a simple configuration, this laser machine includes: a position command calculation unit that compensates for a machining target coordinate in coincidence with predetermined timing on the basis of an offset compensation coefficient for compensating for the machining target coordinate calculated on the basis of position error occurring during machining, compensates for the machining target coordinate in coincidence with predetermined timing on the basis of a temperature compensation coefficient for compensating for the machining target coordinate calculated on the basis of a temperature at the galvanometer reflection mirror and the position error occurring during machining, and outputs results of the compensation as position command information; and a galvanometer mirror control unit that controls the galvanometer reflection mirror on the basis of the position command information.

Patent Document 1: Japanese Unexamined Patent Application, Publication No. 2003-290944
Patent Document 2: Japanese Unexamined Patent Application, Publication No. 2005-292322
Patent Document 3: Japanese Unexamined Patent Application, Publication No. 2007-21507

SUMMARY OF THE INVENTION

Regarding compensation of position error of a laser beam from a target position in a laser machine, while the position error is changed by thermal deformation, etc. occurring in response to change in temperature at a galvanometer mirror during machining, the position error is affected by a plurality of optical parts and constituting members. This has caused difficulty in determining a compensation value in response to the temperature change.

(1) A first aspect of this disclosure is intended for a machine learning device that performs machine learning on a laser machine comprising a plurality of galvanometer mirrors for reflection of a laser beam and a plurality of galvanometer motors for driving corresponding ones of the galvanometer mirrors to rotate, and scanning the laser beam over a workpiece, The machine learning device comprises: input data acquisition unit that acquires at least two detected temperatures from the galvanometer mirrors and the galvanometer motors as input data; label acquisition unit that acquires a coefficient as a label for calculating a target position of machining with the laser beam on the workpiece from an actual machining position relative to the machining target position; and learning unit that performs supervised learning using a set of the label and the input data as training data to construct a mathematical model for calculating the machining target position from the actual machining position on the workpiece on the basis of the at least two detected temperatures.

(2) A second aspect of this disclosure is intended for a laser machine comprising: the machine learning device described in; a scanner head comprising a plurality of galvanometer mirrors for reflection of a laser beam and a plurality of galvanometer motors for driving corresponding ones of the galvanometer mirrors to rotate, and scanning the laser beam over a workpiece; position command calculation unit that calculates a machining target position on the workpiece; position detection unit that detects an actual machining position relative to the machining target position on the workpiece; coefficient calculation unit that calculates a coefficient for calculating the machining target position output from the position command calculation unit from the actual machining position output from the position detection unit; at least two temperature detection unit that detect at least two detected temperatures from the galvanometer mirrors and the galvanometer motors; and compensated position command calculation unit that calculates a compensated machining target position for making a match between the machining target position and the actual machining position from the machining target position on the workpiece at the at least two detected temperatures detected by the at least two temperature detection unit by using a mathematical model for calculating the machining target position from the actual machining position relative to the machining target position on the workpiece on the basis of the at least two detected temperatures output from the machine learning device.

(3) A third aspect of this disclosure is intended for a laser machine comprising: a scanner head comprising a plurality of galvanometer mirrors for reflection of a laser beam and a plurality of galvanometer motors for driving corresponding ones of the galvanometer mirrors to rotate, and scanning the laser beam over a workpiece; position command calculation unit that calculates a machining target position on the workpiece; at least two temperature detection unit that detect at least two detected temperatures from the galvanometer mirrors and the galvanometer motors; and compensated position command calculation unit that calculates a compensated machining target position for making a match between the machining target position and an actual machining position from the machining target position on the workpiece at the at least two detected temperatures detected by the at least two temperature detection unit by using a mathematical model acquired through supervised learning using the at least two detected temperatures as input data and a coefficient as a label for calculating the machining target position from the actual machining position relative to the target position of machining with the laser beam on the workpiece.

(4) A fourth aspect of this disclosure is intended for a laser machining system comprising the machine learning device described in and a laser machine. The laser machine comprises: a scanner head comprising a plurality of galvanometer mirrors for reflection of a laser beam and a plurality of galvanometer motors for driving corresponding ones of the galvanometer mirrors to rotate, and scanning the laser beam over a workpiece; position command calculation unit that calculates a machining target position on the workpiece; position detection unit that detects an actual machining position relative to the machining target position on the workpiece; coefficient calculation unit that calculates a coefficient for calculating the machining target position output from the position command calculation unit from the actual machining position output from the position detection unit; at least two temperature detection unit that detect at least two detected temperatures from the galvanometer mirrors and the galvanometer motors; and compensated position command calculation unit that calculates a compensated machining target position for making a match between the machining target position and the actual machining position from the machining target position on the workpiece at the at least two detected temperatures detected by the at least two temperature detection unit by using a mathematical model for calculating the machining target position from the actual machining position relative to the machining target position on the workpiece on the basis of the at least two detected temperatures output from the machine learning device.

According to each of the foregoing aspects, position error of a laser beam from a target position in a laser machine can be compensated for in response to temperature change while the compensation is to be affected by a plurality of optical parts and constituting members.

BRIEF DESCRIPTION OF THE DRAWINGS

FIG. 7 shows a determinant corresponding to a system consisting of mathematical expressions 1 for calculating a coefficient $a_{ij}$ and a coefficient $b_{ij}$;

DETAILED DESCRIPTION OF THE INVENTION

Figure 1:
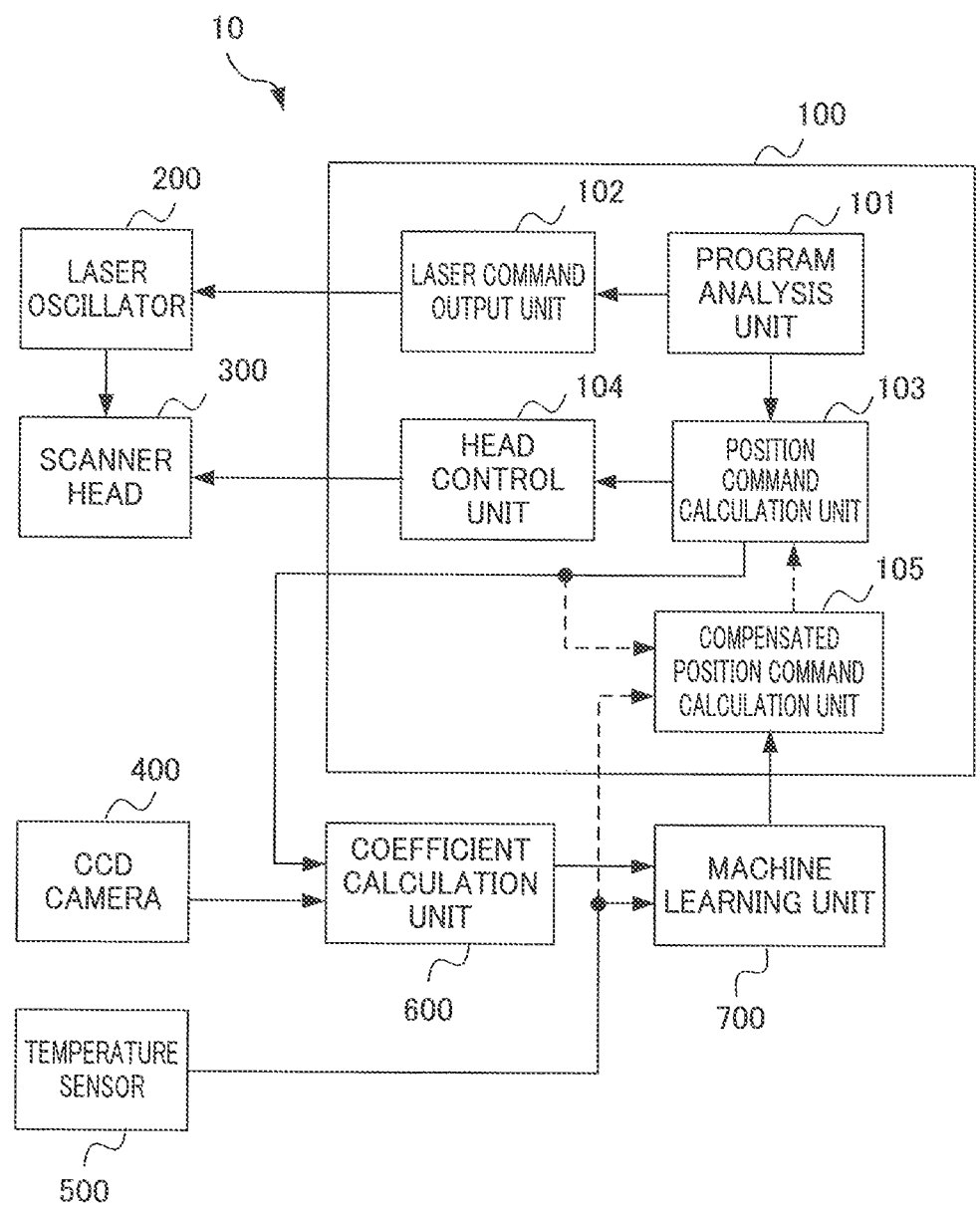
FIG. 1 is a block diagram showing the configuration of a laser machine according to an embodiment of this disclosure during machine learning.

An embodiment of this disclosure will be described below by referring to the drawings.

Entire Configuration of Laser Machine

Figure 2:
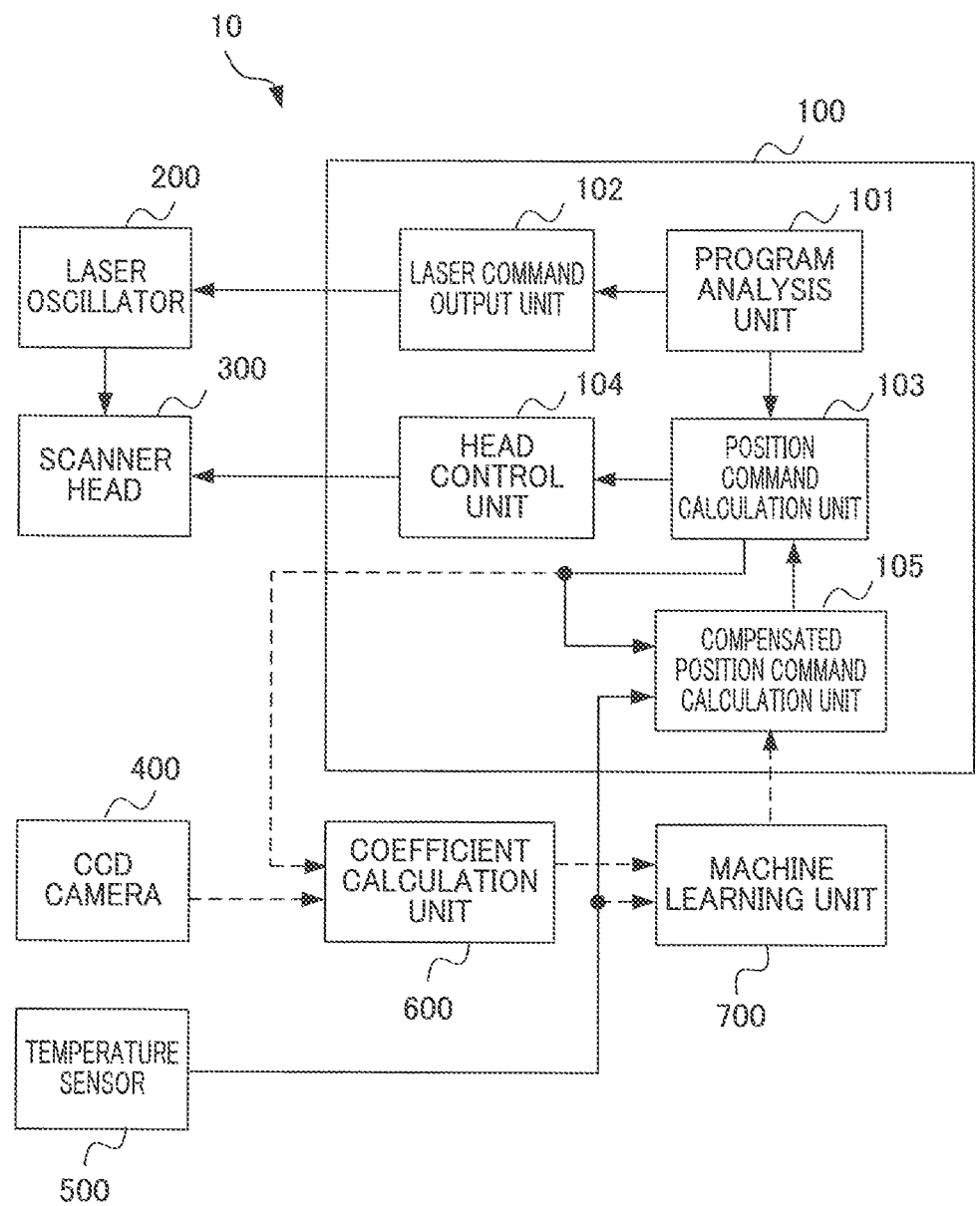
FIG. 2 is a block diagram showing the configuration of the laser machine according to the embodiment of this disclosure after machine learning.
Figure 3:
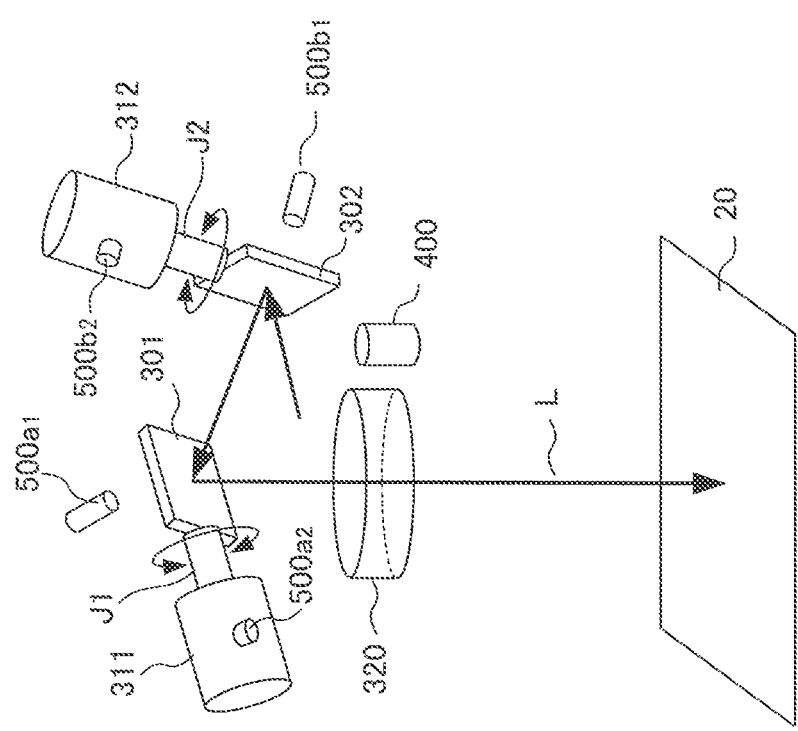
FIG. 3 shows a part of an optical system of a scanner head, a CCD camera, and a temperature sensor in the laser machine.

FIG. 1 is a block diagram showing the configuration of a laser machine according to an embodiment of this disclosure during machine learning. FIG. 2 is a block diagram showing the configuration of the laser machine according to the embodiment of this disclosure after machine learning. FIG. 3 shows a part of an optical system of a scanner head, a CCD camera, and a temperature sensor in the laser machine. In FIGS. 1 and 2, a laser machine 10 includes a control unit 100, a laser oscillator 200, a scanner head 300, a CCD camera 400, a temperature sensor 500, a coefficient calculation unit 600, and a machine learning unit 700. The coefficient calculation unit 600 may be incorporated into the machine learning unit 700.

The control unit 100 includes a program analysis unit 101, a laser command output unit 102, a position command calculation unit 103, a head control unit 104, and a compensated position command calculation unit 105. The compensated position command calculation unit 105 may be incorporated into the position command calculation unit 103. In the embodiment, during machine learning, while the compensated position command calculation unit 105 is not operated, the control unit 100, the laser oscillator 200, the scanner head 300, the CCD camera 400, the temperature sensor 500, the coefficient calculation unit 600, and the machine learning unit 700 are operated. The laser machine 10 does not exert control for suppressing position error of an actual machining position from a machining target position defined in a machining program for machine learning. Thus, in FIG. 1, machining target positional data from the position command calculation unit 103 is not input to the compensated position command calculation unit 105, and a detected temperature from the temperature sensor 500 is not input to the compensated position command calculation unit 105. For this reason, in FIG. 1, a route between the position command calculation unit 103 and the compensated position command calculation unit 105 and a route between the temperature sensor 500 and the compensated position command calculation unit 105 are indicated by dashed lines showing that these routes are disabled.

By contrast, in the embodiment, while the CCD camera 400, the coefficient calculation unit 600, and the machine learning unit 700 are not operated after machine learning, the control unit 100, the laser oscillator 200, the scanner head 300, and the temperature sensor 500 are operated. The laser machine 10 uses the compensated position command calculation unit 105 to exert control for suppressing position error of an actual machining position from a machining target position defined in an actual machining program. Thus, in FIG. 2, an output from the CCD camera 400 is not input to the coefficient calculation unit 600, and an output from the position command calculation unit 103 is not input to the coefficient calculation unit 600. Further, an output from the coefficient calculation unit 600 is not input to the machine learning unit 700, and a detected temperature from the temperature sensor 500 is not input to the machine learning unit 700. For this reason, in FIG. 2, a route between the coefficient calculation unit 600 and the CCD camera 400, a route between the coefficient calculation unit 600 and the position command calculation unit 103, a route between the machine learning unit 700 and the coefficient calculation unit 600, and a route between the machine learning unit 700 and the temperature sensor 500 are indicated by dashed lines showing that these routes are disabled. After the machine learning, the CCD camera 400, the coefficient calculation unit 600, and the machine learning unit 700 may be separated from the laser machine and the laser machine may be configured as a machine without the CCD camera 400, the coefficient calculation unit 600, and the machine learning unit 700.

Each of the routes may be disabled by preventing signal output from a signal output side of each route, preventing acceptance of a signal by a signal input side of each route, or switching between transmission and interruption of a signal using a switch provided in each route, for example.

The program analysis unit 101 receives an actual machining program during actual machining after machine learning or a machining program for machine learning during the machine learning (hereinafter called a learning program) from an input device not shown, and analyzes the actual machining program or learning program. The program analysis unit 101 analyzes the actual machining program or learning program, generates laser output information about a laser beam L to be output from the scanner head 300 on the basis of a result of the analysis, and outputs the generated laser output information to the laser command output unit 102. Further, the program analysis unit 101 generates operation command information about a direction of scanning of a laser beam with the scanner head 300 and a target speed of the scanning, and outputs the generated operation command information to the position command calculation unit 103.

The laser command output unit 102 outputs a laser output command to the laser oscillator 200 in such a manner that the laser beam L output from the scanner head 300 produces intended laser output based on the laser output information output from the program analysis unit 101.

The laser oscillator 200 is composed of a laser medium, an optical resonator, an excitation source, etc. (all of which are not shown). The laser oscillator 200 generates the laser beam L to produce laser output based on the laser output command, and outputs the generated laser beam L to the scanner head 300.

Figure 4:
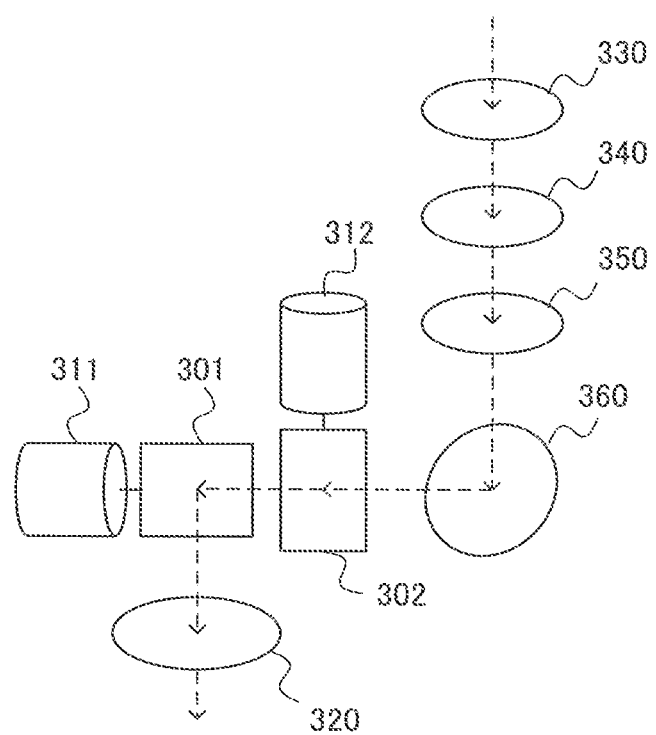
FIG. 4 shows the entire configuration of the optical system of the scanner head.

As an example, the scanner head 300 is a galvanometer scanner capable of receiving the laser beam L output from the laser oscillator 200 and scanning the laser beam L over a workpiece 20. As shown in FIG. 3, the scanner head 300 includes two galvanometer mirrors 301 and 302 for reflection of the laser beam L output from the laser oscillator 200, galvanometer motors 311 and 312 for driving the galvanometer mirrors 301 and 302 to rotate respectively, and a cover glass 320. As shown in FIG. 4, the scanner head 300 includes three focusing lens 330, 340 and 350, and a reflection mirror 360.

The cover glass 320 has a circular columnar shape. The cover glass 320 has the function of causing the laser beam L to pass through after the laser beam L is sequentially reflected on the galvanometer mirrors 301 and 302, and protecting the interior of the scanner head 300.

During machine learning, the position command calculation unit 103 generates machining target positional data on the basis of the operation command information, and outputs the machining target positional data as a position command to the head control unit 104 and the coefficient calculation unit 600. The position command calculation unit 103 corresponds to position command calculation means. After the machine learning, the position command calculation unit 103 outputs the machining target positional data to the compensated position command calculation unit 105, and outputs compensated machining target positional data as a position command generated by the compensated position command calculation unit 105 to the head control unit 104. The compensated machining target positional data may be output directly from the compensated position command calculation unit 105 to the head control unit 104 without intervention by the position command calculation unit 103.

The head control unit 104 outputs the position command from the position command calculation unit 103 to the scanner head 300 as driving control data for rotating the galvanometer motors 311 and 312. On the basis of the driving control data, the galvanometer motors 311 and 312 of the scanner head 300 rotate the galvanometer mirrors 301 and 302 respectively and independently of each other about two rotary axes J1 and J2 perpendicular to each other, thereby controlling scanning of the laser beam L output from the scanner head 300 to the workpiece 20.

Figure 5:
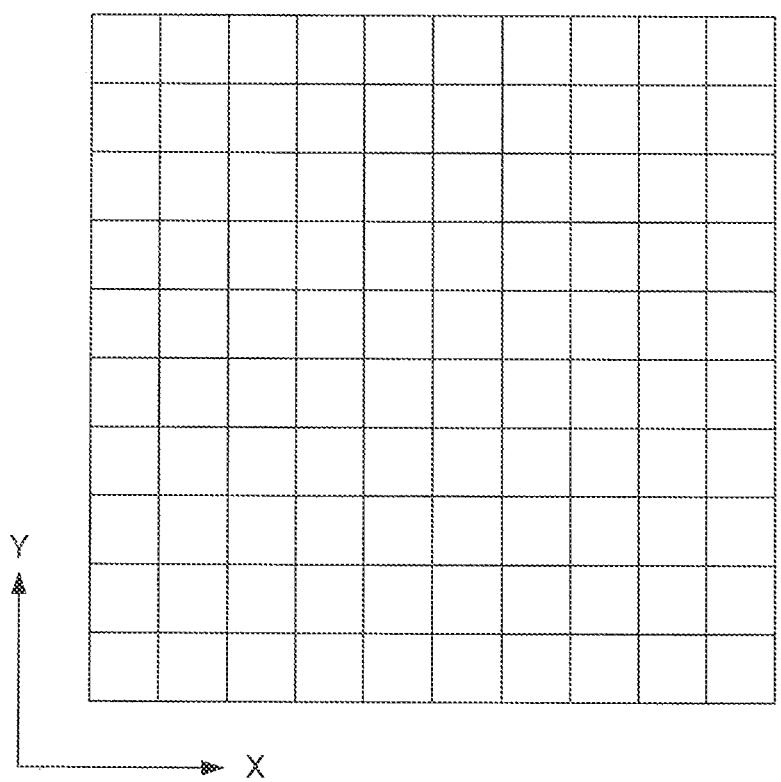
FIG. 5 shows a scanning route of a laser beam output onto a workpiece according to a learning program.

A scanning route of the laser beam L output from the scanner head 300 onto the workpiece 20 can be changed optionally in an X direction and a Y direction shown in FIG. 5 by controlling rotary driving of the galvanometer motors 311 and 312 appropriately and changing the respective rotation angles of the galvanometer mirrors 301 and 302. FIG. 5 shows a scanning route of the laser beam output onto the workpiece according to the learning program. As shown in FIG. 5, the scanning route of the laser beam has a lattice pattern. The shape of the scanning route of the laser beam is not particularly limited to a lattice pattern but may be a different pattern.

The CCD camera 400 captures an image of a machining position on the workpiece 20, determines machining positional data (x', y') from an output image of a machining locus, and outputs the determined machining positional data (x', y') to the coefficient calculation unit 600. The CCD camera 400 corresponds to position detection unit. The temperature sensor 500 measures temperatures at the galvanometer mirrors 301 and 302 and the galvanometer motors 311 and 312 to affect laser beam scanning, and outputs the measured temperatures to the machine learning unit 700 during machine learning and to the compensated position command calculation unit 105 after the machine learning. For example, the temperature sensor 500 is non-contact type temperature sensors 500a1 and 500b1 provided adjacent to the galvanometer mirrors 301 and 302 respectively, and contact type temperature sensors 500a2 and 500b2 attached to the galvanometer motors 311 and 312 respectively. The temperature sensor 500 corresponds to temperature detection unit.

Position error of an actual machining position from a machining target position is caused by thermal deformations of the galvanometer mirrors 301 and 302, distortion of assembly resulting from thermal deformations of fixed parts of the galvanometer mirrors 301 and 302, and distortion of assembly resulting from thermal deformations of fixed parts of the galvanometer motors 311 and 312, for example.

The position error of the machining position from the machining target position is also caused by thermal deformations of the three focusing lenses 330, 340 and 350 and the reflector 360, and distortion of assembly resulting from thermal deformations of fixed parts of the three focusing lenses 330, 340 and 350 and a fixed part of the reflector 360. The position error of the machining position from the machining target position is caused by factors such as heat generated by a laser beam, heat generated by a galvanometer motor, and change in environmental temperature, for example. In the example described in the embodiment, temperature changes at the galvanometer mirrors 301 and 302 are measured using the non-contact type temperature sensors 500a1 and 500b1, and temperature changes at the galvanometer motors 311 and 312 are measured using the contact type temperature sensors 500a2 and 500b2. If consideration is further given to temperature changes at the three focusing lenses 330, 340 and 350 and the reflection mirror 360 for temperature compensation in the laser machine, a non-contact type or contact type temperature sensor is attached to each of the three focusing lenses 330, 340 and 350 and the reflection mirror 360.

The coefficient calculation unit 600 acquires machining target positional data (x, y) before compensation from the position command calculation unit 103. Further, the coefficient calculation unit 600 acquires the machining positional data (x', y') from the CCD camera 400. The CCD camera 400 may perform process of outputting an output image, and the coefficient calculation unit 600 may perform process of determining the machining positional data (x', y') from the output image. In this case, the CCD camera 400 and part of the coefficient calculation unit 600 correspond to the position detection unit. Then, the coefficient calculation unit 600 calculates an $M^2$ point by solving mathematical expressions 1 (also called Math. 1) simultaneously. The coefficient calculation unit 600 corresponds to coefficient calculation means.

$$x = \sum_{i=0}^{N}\sum_{j=0}^{N} a_{ij} x'^i y'^j \quad \text{[Math. 1]}$$

$$y = \sum_{i=0}^{N}\sum_{j=0}^{N} b_{ij} x'^i y'^j$$

Figure 6:
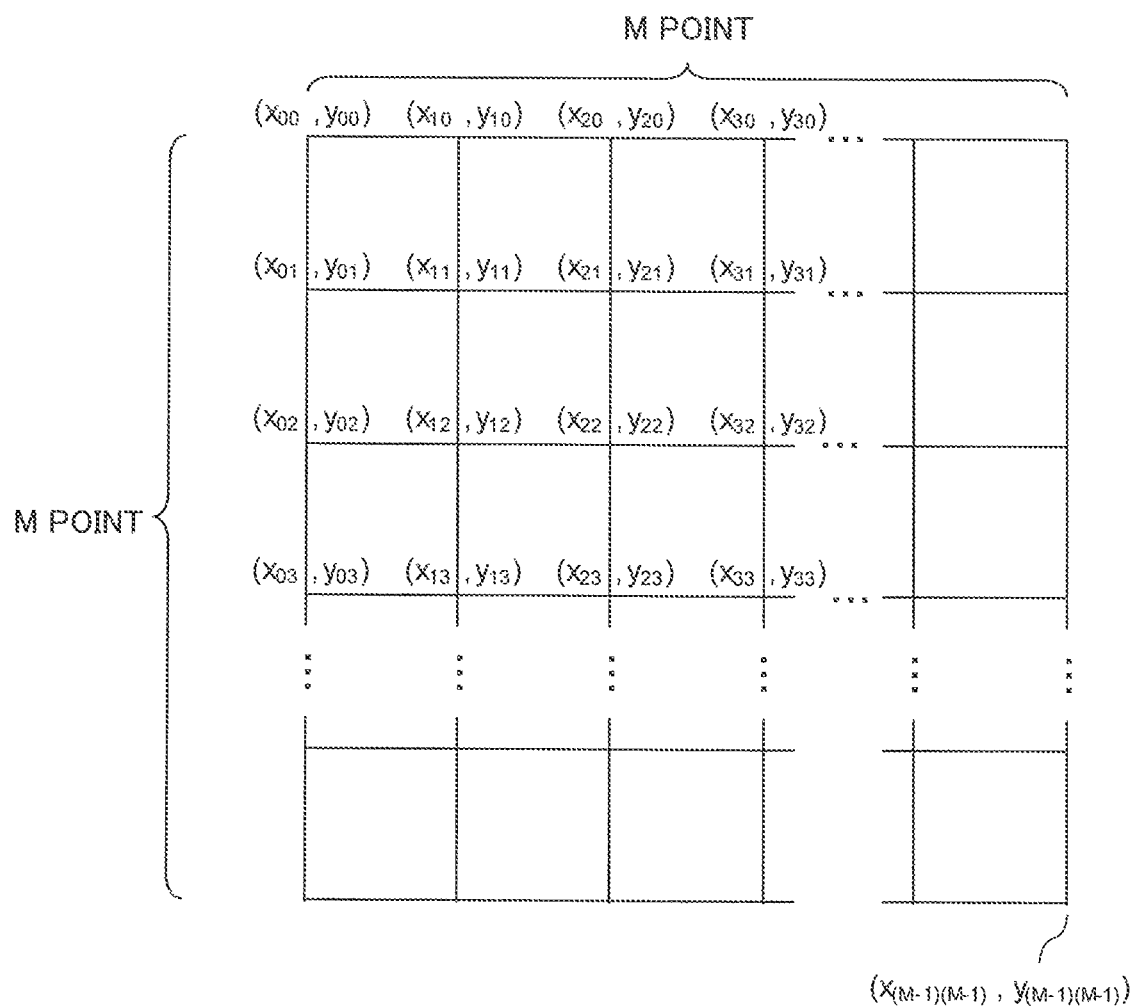
FIG. 6 shows machining target positional data (x, y) before compensation.

FIG. 6 shows a measurement point at the $M^2$ point. FIG. 7 shows a determinant corresponding to a system consisting of the mathematical expressions 1 for calculating the coefficients $a_{ij}$ and $b_{ij}$ using the machining positional data (x', y') and the machining target positional data (x, y) about the machining point at the $M^2$ point. The coefficients $a_{ij}$ and $b_{ij}$ are calculated by simultaneously solving the Math. 1 as shown in FIG. 7 into which the machining positional data (x', y') and the machining target positional data (x, y) about the machining point at the $M^2$ point ($M^2 \geq (N+1)^2$) are substituted.

The machine learning unit 700 learns a coefficient $a'_{ij}(T)$ and a coefficient $b'_{ij}(T)$ about a detected temperature T from the temperature sensor 500 defined in a mathematical model of the mathematical expressions 2 (also called Math. 2) by using the detected temperature T as input data and the coefficients $a_{ij}$ and $b_{ij}$ output from the coefficient calculation unit 600 as a label. Then, the machine learning unit 700 outputs the mathematical model of the mathematical expressions 2 to the compensated position command calculation unit 105. The machine learning unit 700 corresponds to a machine learning device. The mathematical model of the mathematical expressions 2 containing the coefficients $a'_{ij}(T)$ and $b'_{ij}(T)$ defined on the basis of the detected temperature T is a determinant formulated by replacing the coefficients $a_{ij}$ and $b_{ij}$ in FIG. 7 with the coefficients $a'_{ij}(T)$ and $b'_{ij}(T)$ respectively.

$$x = \sum_{i=0}^{N}\sum_{j=0}^{N} a'_{ij}(T) x'^i y'^j \quad \text{[Math. 2]}$$

$$y = \sum_{i=0}^{N}\sum_{j=0}^{N} b'_{ij}(T) x'^i y'^j$$

The detected temperature T from the temperature sensor 500 corresponds to detected temperatures from the non-contact type temperature sensors 500a1 and 500b1 and from the contact type temperature sensors 500a2 and 500b2.

After machine learning, the compensated position command calculation unit 105 compensates for the machining target positional data (x, y) output from the position command calculation unit 103 by using the mathematical model of the mathematical expressions 2 containing the coefficients $a'_{ij}(T)$ and $b'_{ij}(T)$ output from the machine learning unit 700 and on the basis of the detected temperature from the temperature sensor 500, and outputs machining target positional data (x", y") resulting from the compensation to the position command calculation unit 103. The compensated position command calculation unit 105 corresponds to compensated position command calculation unit. The compensated machining target positional data (x", y") can be determined by using a mathematical model of mathematical expressions 3 (also called Math. 3) containing x" and y" as replacements for x and y respectively in the mathematical expressions 2 and containing x and y as replacements for x' and y' respectively in the mathematical expressions 2.

$$x'' = \sum_{i=0}^{N}\sum_{j=0}^{N} a'_{ij}(T) x^i y^j \qquad \text{[Math. 3]}$$

$$y'' = \sum_{i=0}^{N}\sum_{j=0}^{N} b'_{ij}(T) x^i y^j$$

The position command calculation unit 103 outputs the machining target positional data (x", y") as a position command to the head control unit 104. The head control unit 104 drives the scanner head 300.

Figure 8:
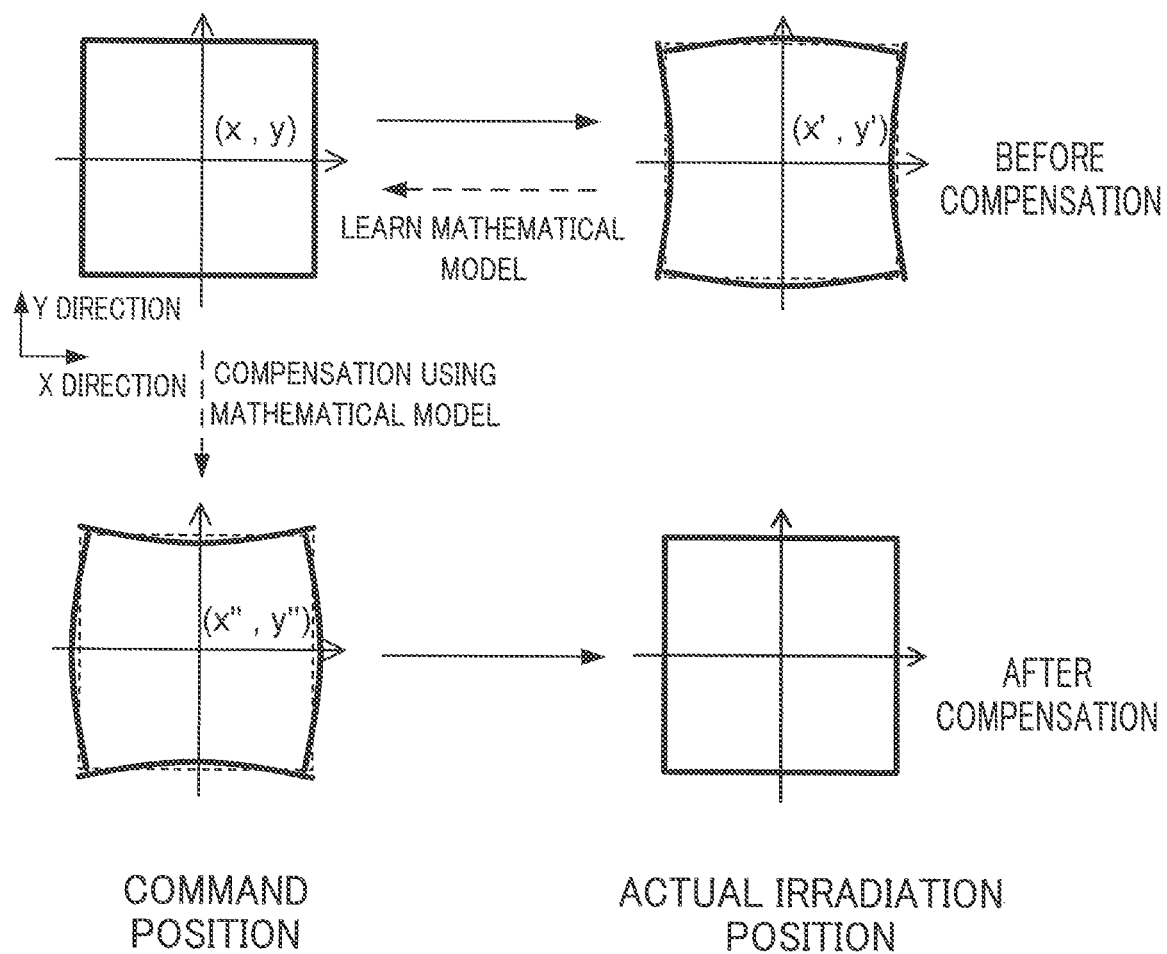
FIG. 8 is an explanatory view showing a relationship between a command position and an actual irradiation position before compensation and a relationship between a command position and an actual irradiation position after the compensation.

FIG. 8 is an explanatory view showing a relationship between a command position and an actual irradiation position (machining position) before compensation and a relationship between a command position and an actual irradiation position after the compensation. During machine learning, the head control unit 104 scans the scanner head 300 using the machining target positional data (x, y) as a command position. The coefficient calculation unit 600 acquires an output image of a machining locus from the CCD camera 400 obtained by scanning of a laser beam over the workpiece 20, and determines the machining positional data (x', y') indicating an actual irradiation position. In the illustration of FIG. 8, the machining positional data (x', y') contains position error from the machining target positional data (x, y) occurring in such a manner that the absolute value of an x coordinate in the x direction is increased and position error from the machining target positional data (x, y) occurring in such a manner that the absolute value of a y coordinate in the y direction is reduced.

The machine learning unit 700 learns the coefficients $a'_{ij}(T)$ and $b'_{ij}(T)$ defined on the basis of the detected temperature T and contained in the mathematical model of the mathematical expressions 2 assuming the machining positional data (x', y') as the machining target positional data (x, y). After the machine learning, the compensated position command calculation unit 105 compensates for the machining target positional data (x, y) output from the position command calculation unit 103 by using the mathematical model expressed by the mathematical expressions 3 and on the basis of the detected temperature from the temperature sensor 500, thereby acquiring the compensated machining target positional data (x", y").

The position command calculation unit 103 outputs the machining target positional data (x", y") as a position command to the head control unit 104. The head control unit 104 scans the scanner head 300 on the basis of the machining target positional data (x", y") as a command position. An actual irradiation position (machining position) determined by the scanning of the scanner head 300 corresponds to the machining target positional data (x, y). In this way, it becomes possible to obtain a laser machine in which position error of an actual machining position from a machining target position is suppressed.

Figure 9:
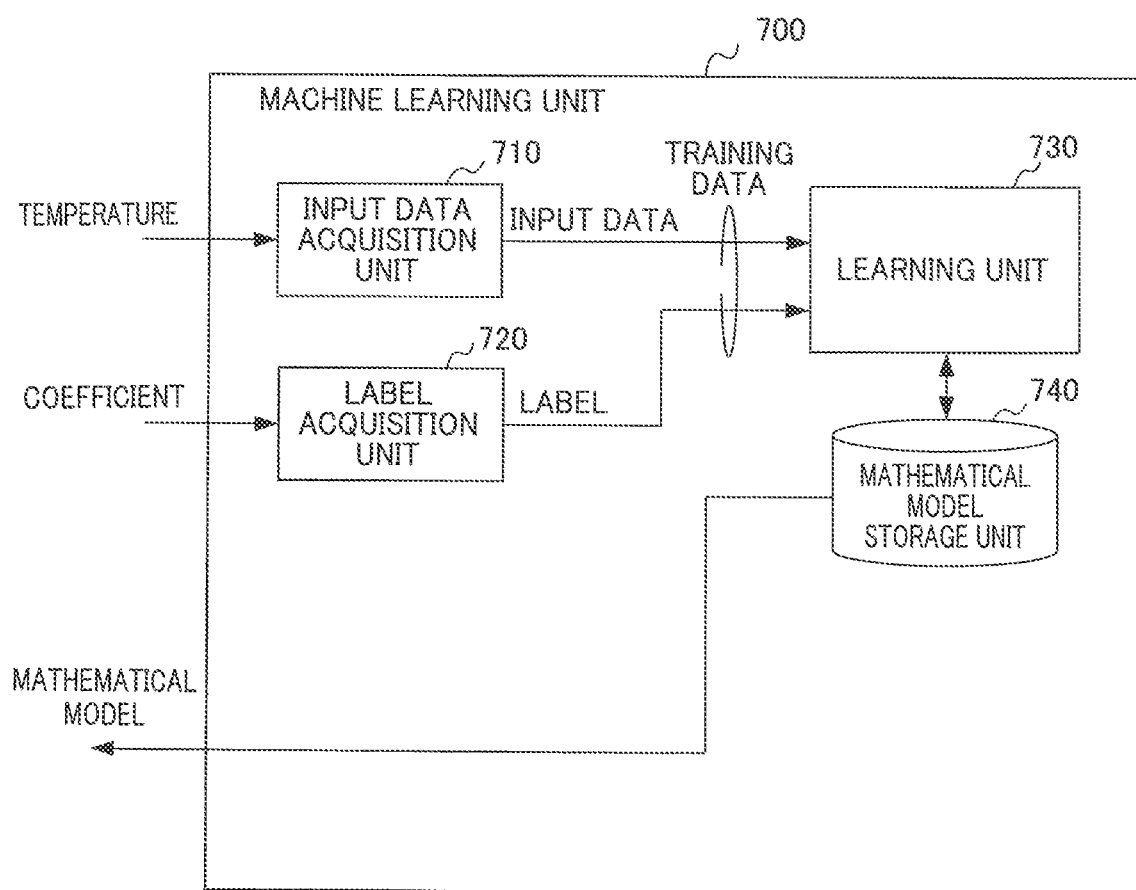
FIG. 9 is a block diagram showing the configuration of a machine learning unit.

The configuration and operation of the machine learning unit 700 as a machine learning device will be described further using FIG. 9. FIG. 9 is a block diagram showing the configuration of the machine learning unit. As shown in FIG. 9, the machine learning unit 700 includes an input data acquisition unit 710 as input data acquisition means, a label acquisition unit 720 as label acquisition means, a learning unit 730 as learning means, and a mathematical model storage unit 740.

The input data acquisition unit 710 acquires the detected temperature T from the temperature sensor 500, and outputs the acquired input data to the learning unit 730. The detected temperature T from the temperature sensor 500 mentioned herein corresponds to detected temperatures from the non-contact type temperature sensors 500a1 and 500b1 and from the contact type temperature sensors 500a2 and 500b2. The label acquisition unit 720 acquires the coefficients $a_{ij}$ and $b_{ij}$ from the coefficient calculation unit 600, and outputs the acquired label to the learning unit 730.

By doing so, the detected temperature T as input data and the coefficients $a_{ij}$ and $b_{ij}$ as a label are input as a set to the learning unit 730. This set of the input data and the label corresponds to training data in machine learning.

The learning unit 730 performs supervised learning on the basis of the training data to calculate the coefficients $a'_{ij}(T)$ and $b'_{ij}(T)$ defined on the basis of the detected temperature T. The supervised learning itself is well known to a person skilled in the art, so that it will not be described in detail but will be described in outline.

The supervised learning is performed using a neural network constructed by combining perceptrons, for example. More specifically, a set of the detected temperature T as input data and the coefficients $a_{ij}$ and $b_{ij}$ as a label contained in the training data is given to the neural network, and learning is performed repeatedly while a weight added to each perceptron is changed so as to match an output from the neural network with the label. For example, process employing forward-propagation and then back-propagation (also called backward propagation of errors) is performed repeatedly, thereby adjusting a weight value so as to reduce error between outputs from the corresponding perceptrons.

Figure 10:
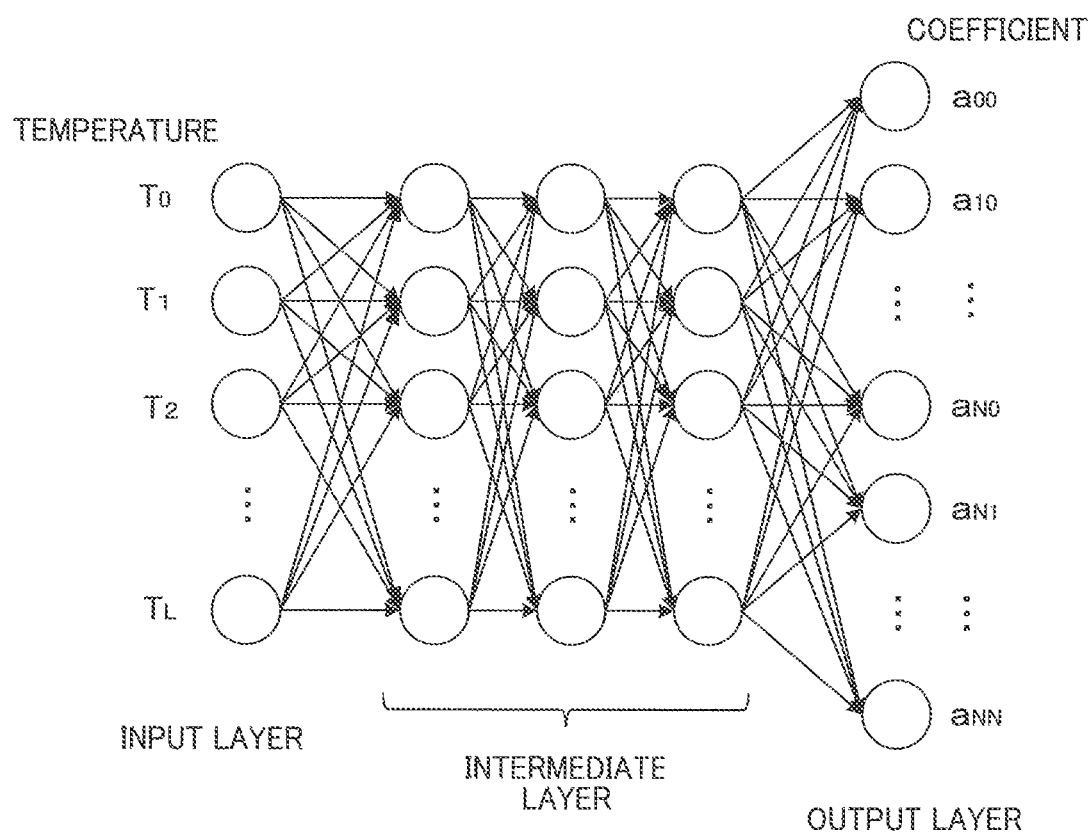
FIG. 10 is an explanatory view showing the configuration of a learning unit determined by deep learning.

The neural network used for the learning by the learning unit 730 may have three layers or more layers. The learning may be performed by means of what is called deep learning (also called deep-structured learning). FIG. 10 is an explanatory view showing the configuration of the learning unit determined by the deep learning. In FIG. 10, the neural network is composed of an input layer, an intermediate layer, and an output layer. This intermediate layer is composed of three layers. Temperatures $T_0$ to $T_L$ in FIG. 10 indicate the detected temperature T as an input to the neural network. Coefficients $a_{00}$ to $a_{NN}$ mean coefficients calculated through the neural network. These temperatures $T_0$ to $T_L$ include temperatures $T_0$ to $T_3$ (L=3). The temperatures $T_0$ to $T_3$ correspond to detected temperatures from the non-contact type temperature sensors 500a1 and 500b1 and from the contact type temperature sensors 500a2 and 500b2. As described above, the features of the training data are learned to acquire the coefficients $a'_{ij}(T)$ and $b'_{ij}(T)$ recursively for estimating an output from an input.

As described above, the supervised learning mentioned herein is to eliminate error between a label and output data by changing a weight value. In the embodiment, the label corresponds to the coefficients $a_{ij}$ and $b_{ij}$ and an input corresponds to the detected temperature T. As a result, the coefficients $a'_{ij}(T)$ and $b'_{ij}(T)$ calculated by repeated implementations of the learning by the learning unit 730 become the coefficients in the mathematical expressions 2 used for determining the machining target positional data (x, y) from the machining positional data (x', y').

The mathematical model of the mathematical expressions 2 containing the coefficients $a'_{ij}(T)$ and $b'_{ij}(T)$ calculated by the learning unit 730 is output to the mathematical model storage unit 740.

The mathematical model storage unit 740 is a storage unit that stores the mathematical model of the mathematical expressions 2 containing the coefficients $a'_{ij}(T)$ and $b'_{ij}(T)$ calculated by the learning unit 730. The compensated position command calculation unit 105 acquires the mathematical model of the mathematical expressions 2 from the mathematical model storage unit 740 before implementation of actual machining, and constructs a mathematical model of the mathematical expressions 3 using the mathematical model of the mathematical expressions 2. The mathematical model of the mathematical expressions 3 is for acquiring the compensated machining target positional data (x", y") from the machining target positional data (x, y). The machining target positional data (x", y") takes a value resulting from compensation of actual position error occurring in response to the detected temperature T from the machining target positional data (x, y). An actual irradiation position (machining position) acquired through scanning of the scanner head 300 based on the acquired machining target positional data (x", y") corresponds to the machining target positional data (x, y).

The functional blocks of the machine learning unit 700 are as described above. To realize these functional blocks, the machine learning unit 700 includes an operational processor such as a central processing unit (CPU). The machine learning unit 700 further includes an auxiliary storage unit such as a hard disk drive (HDD) storing various types of control programs and a main storage unit such as a random access memory (RAM) for storing data temporarily required in execution of a program by the operational processor.

In the machine learning unit 700, the operational processor reads an application and an OS from the auxiliary storage unit. While the read application and OS are developed on the main storage unit, operation process based on these application and OS are performed. On the basis of a result of the operation, each type of hardware provided at each unit is controlled. By doing so, the functional blocks of the machine learning unit 700 according to the embodiment are realized. Namely, the embodiment can be realized by cooperative work between hardware and software.

As a specific example, the machine learning unit 700 can be realized using part of a personal computer, a server, or a computerized numerical control (CNC) device. In consideration of a large amount of operation accompanying machine learning by the machine learning unit 700, high-speed processing may be encouraged by installing graphics processing units (GPUs) on a personal computer, and using the GPUs for operation accompanying the machine learning by means of a technique called general-purpose computing on graphics processing units (GPGPUs), for example. Additionally, for higher speed processing, two or more computers equipped with such GPUs may be used to construct a computer cluster, and parallel processing may be performed using two or more computers included in this computer cluster.

Figure 11:
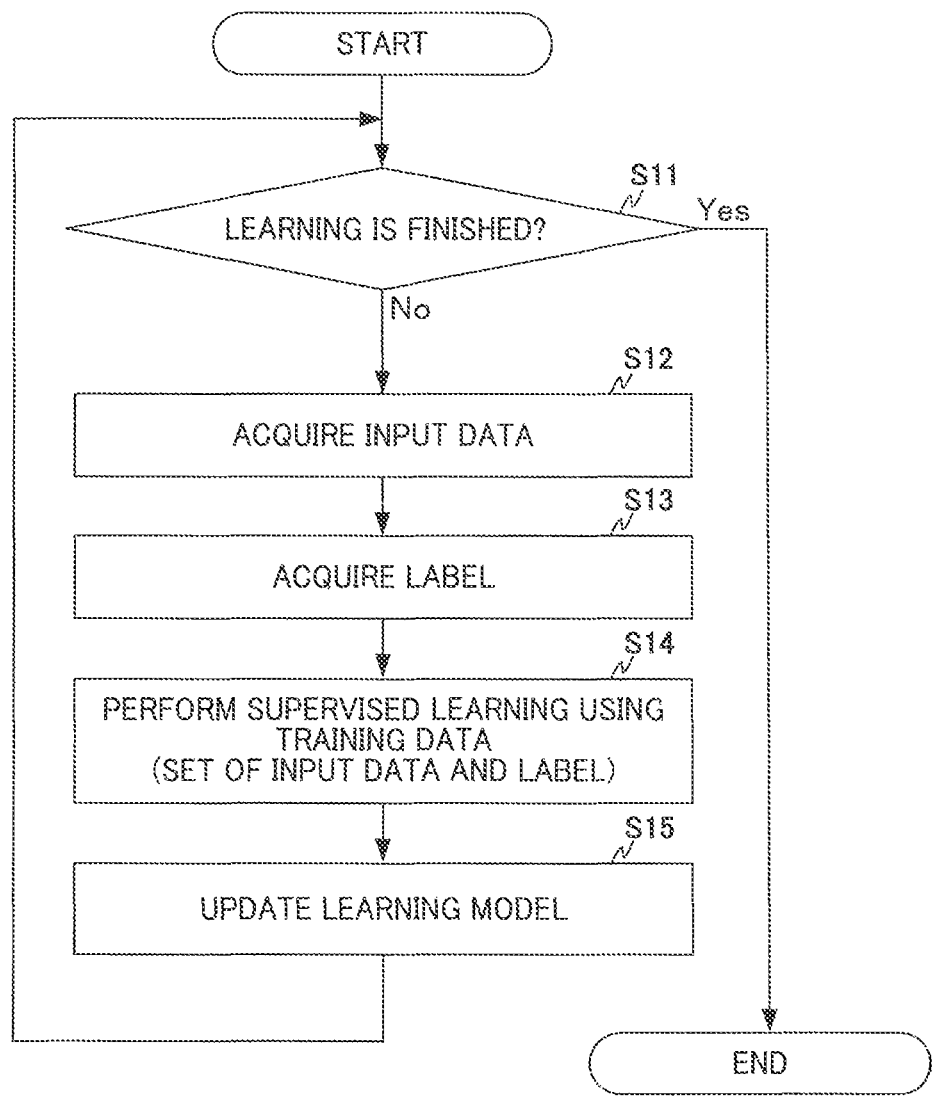
FIG. 11 is a flowchart showing operation relating to machine learning by the machine learning unit according to the embodiment.

Operation relating to machine learning by the machine learning unit 700 according to the embodiment will be described next by referring to the flowchart in FIG. 11. In step S11, the machine learning unit 700 determines whether machine learning is finished.

Here, if the machine learning is finished, a determination is Yes in step S11 and the processing is finished. If the machine learning is not finished, a determination is No in step S11 and the processing proceeds to step S12. In step S12 and step S13, the input data acquisition unit 710 and the label acquisition unit 720 of the machine learning unit 700 acquire input data and a label respectively. The specifics of the acquired pieces of data are the same as those described above.

In step S14, the learning unit 730 of the machine learning unit 700 performs the machine learning using the training data. The specifics of the machine learning using the training data are also the same as those described above.

In step S15, the learning unit 730 outputs a learning model containing the calculated coefficients $a'_{ij}$ and $b'_{ij}$ to the mathematical model storage unit 740, thereby updating the learning model. Then, the processing proceeds again to step S11.

As described above, the processes from step S11 to step S15 are repeated until the machine learning is finished to continuously perform the learning. The machine learning may be finished in response to instruction from a user. Alternatively, the machine learning may be finished after being performed repeatedly a predetermined number of times, for example. As a result, it becomes possible to construct a mathematical model for suppressing position error of an actual machining position from a machining target position.

The scanner head in the laser machine according to the embodiment may have three or more galvanometer mirrors to be rotated by corresponding galvanometer motors independent of each other.

While the foregoing embodiments are preferred embodiments of the present invention, the scope of the present invention is not limited only to each of the foregoing embodiments but the present invention can be implemented as embodiments to which various changes are made within a range not deviating from the substance of the present invention. For example, the present invention can be implemented as embodiments to which the following changes are made.

<Modification in which Control Unit Includes at least One of Coefficient Calculation Unit and Machine Learning Unit>

In the foregoing embodiment, the coefficient calculation unit 600 and the machine learning unit 700 are configured as units separate from the control unit 100. Alternatively, part or all of the function of the coefficient calculation unit 600 may be realized by the control unit 100. Still alternatively, part or all of the function of the machine learning unit 700 may be realized by the control unit 100.

<Flexibility of System Configuration>

Figure 12:
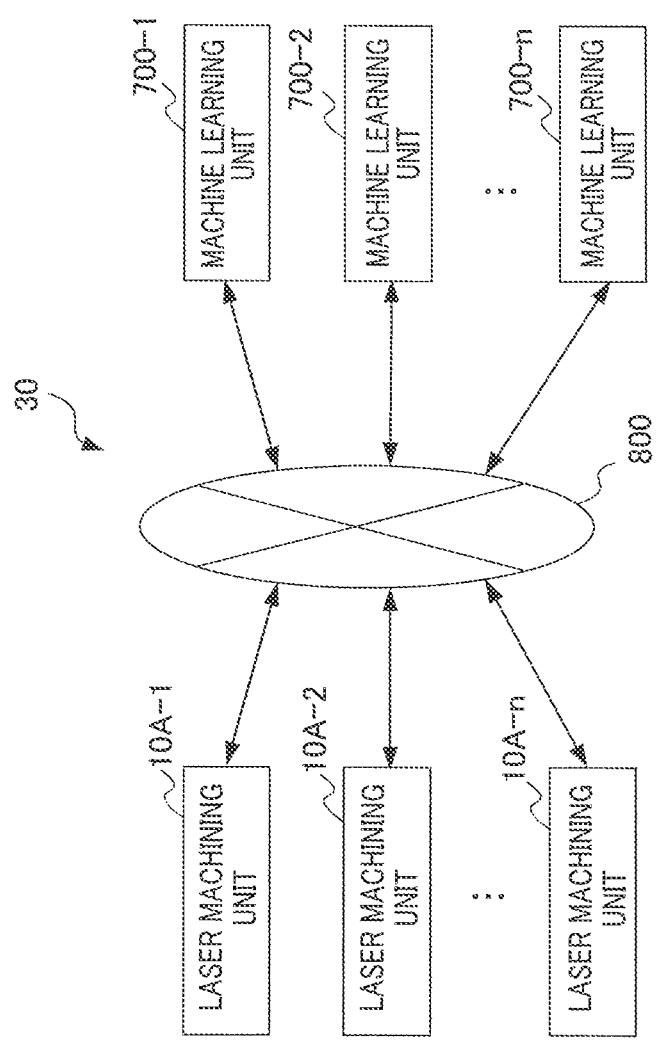
FIG. 12 is a block diagram showing the configuration of a laser machining system according to an embodiment of this disclosure.

In the foregoing embodiment, the machine learning unit 700 is connected to the control unit 100, the temperature sensor 500, and the coefficient calculation unit 600 to form the laser machine. However, this is not the limited configuration of the embodiment. FIG. 12 is a block diagram showing the configuration of a laser machining system according to an embodiment of this disclosure. As shown in FIG. 12, a laser machining system 30 includes n laser machining units 10A-1 to 10A-n, n machine learning units 700-1 to 700-n, and a network 800. Here, n is an optional natural number. The n machine learning units 700-1 to 700-n correspond to the machine learning unit 700 shown in FIGS. 1 and 2. Each of the laser machining units 10A-1 to 10A-n corresponds to the laser machine 10 in FIGS. 1 and 2 from which the machine learning unit 700 is omitted.

The laser machining unit 10A-1 and the machine learning unit 700-1 are connected as one set in a one-to-one relationship in such a manner as to be capable of communicating with each other through the network 800. The laser machining units 10A-2 to 10A-n and corresponding ones of the machine learning units 700-2 to 700-n are connected in the same way as the laser machining unit 10A-1 and the machine learning unit 700-1. In FIG. 12, n sets of the laser machining units 10A-1 to 10A-n and the machine learning units 700-1 to 700-n are connected through the network 800. Alternatively, each set of a laser machining unit and a machine learning unit belonging to the n sets of the laser machining units 10A-1 to 10A-*n* and the machine learning units 700-1 to 700-*n* may be connected directly through a connection interface. Two or more of the n sets of the laser machining units 10A-1 to 10A-*n* and the machine learning units 700-1 to 700-*n* may be installed in the same factory, or all these sets may be installed in different factories, for example.

For example, the network 800 is a local area network (LAN) installed in a factory, the Internet, a public telephone network, or a combination of these networks. The network 800 is not particularly limited in terms of a specific communication system, or whether the network 800 is connected with a wire or without wires, for example.

One machine learning unit and a plurality of laser machining units may be connected directly or through a network in a manner allowing communication therebetween, and this machine learning unit may be responsible for machine learning on these laser machining units. In this case, a distributed processing system may be employed to distribute the functions of the machine learning unit between a plurality of servers appropriately. Alternatively, the functions of the machine learning unit may be realized using a virtual server function in a cloud, for example.

In the presence of a plurality of laser machines such as the one shown in FIGS. 1 and 2 and having the same model name, having the same specification, or belonging to the same series, these laser machines may be configured to share a learning result obtained by each of the laser machines. This makes it possible to construct a model closer to an optimum model.

<Online Learning, Batch Learning, and Mini-Batch Learning>

The foregoing supervised learning by the learning unit 730 may be performed as online learning, batch learning, or mini-batch learning. The online learning is a learning method by which, each time the laser machine is driven and training data is generated, the supervised learning is performed immediately. The batch learning is a learning method by which, while the laser machine is driven and training data is generated repeatedly, multiple pieces of training data responsive to the repetitions are collected and the supervised learning is performed using all the collected pieces of training data. The mini-batch learning is a learning method intermediate between the online learning and the batch learning by which, each time a certain quantity of training data is accumulated, the supervised learning is performed.

The foregoing embodiment can be realized by hardware, software, or a combination of hardware and software. Being realized by software means being realized by reading and execution of a program by a computer. If hardware is used for configuring the embodiment, each embodiment can be configured using an integrated circuit (IC) such as a large scale integrated circuit (LSI), an application specific integrated circuit (ASIC), a gate array, or a field programmable gate array (FPGA), for example.

The foregoing embodiment can be configured partially or entirely using a combination of software and hardware in a computer including a storage unit such as a hard disk or a ROM storing a program describing all or part of the operation of the machine learning device illustrated in the flowchart, a DRAM storing data required for operation, a CPU, and a bus for connection between the units. In this computer, the embodiment can be configured by storing information necessary for the operation into the DRAM and making the CPU execute the program.

The program can be stored into various types of computer-readable media and can be supplied to the computer. The computer-readable media include various types of tangible storage media. Examples of the computer-readable media include a magnetic storage medium (a hard disk drive, for example), a magneto-optical storage medium (an magneto-optical disk, for example), a CD read-only memory (CD-ROM), a CD-R, a CD-R/W, and a semiconductor memory (a mask ROM, a programmable ROM (PROM), an erasable PROM (EPROM), a flash ROM, or a random access memory (RAM), for example).

EXPLANATION OF REFERENCE NUMERALS

10 Laser machine
20 Workpiece
30 Laser machining system
100 Control unit
101 Program analysis unit
102 Laser command output unit
103 Position command calculation unit
104 Head control unit
105 Compensated position command calculation unit
200 Laser oscillator
300 Scanner head
400 CCD camera
500 Temperature sensor
600 Coefficient calculation unit
700 Machine learning unit
L Laser beam

What is claimed is:

1. A machine learning device that performs machine learning on a laser machine comprising a plurality of galvanometer mirrors for reflection of a laser beam and a plurality of galvanometer motors for driving and rotating corresponding ones of the galvanometer mirrors according to driving control data generated based on a position command indicating a machining target position on a workpiece, and scanning the laser beam over the workpiece, the machine learning device comprising:

input data acquisition unit that acquires, as input data, a detected temperature of at least one galvanometer mirror of the plurality of galvanometer mirrors and a detected temperature of at least one galvanometer motor of the plurality of galvanometer motors that drives and rotates the at least one galvanometer mirror;

label acquisition unit that acquires, as a label, a coefficient for calculating the machining target position from an actual position of machining with the laser beam on the workpiece relative to the machining target position, the coefficient being acquired from a coefficient calculation unit before calculation of the machining target position and the actual machining position, the coefficient calculation unit acquiring machining target position data at the time of acquisition of the detected temperature of the at least one galvanometer mirror and the detected temperature of the at least one galvanometer motor as the input data by the input data acquisition unit, and concurrently obtaining the coefficient by solving a plurality of mathematical expressions; and learning unit that performs supervised learning using a set of the label and the input data as training data to construct a mathematical model for calculating the machining target position from the actual machining position on the workpiece on the basis of the at least two detected temperatures consisting of the detected temperature of the at least one galvanometer mirror and the detected temperature of the at least one galvanometer motor, the learning unit calculating a plurality of coefficients defined based on the at least two detected temperatures consisting of the detected temperature of the at least one galvanometer mirror and the detected temperature of the at least one galvanometer motor according to the mathematical model using the training data, and outputting the mathematical model.

2. The machine learning device according to claim 1, wherein the machining target position is output from the laser machine,
the actual machining position on the workpiece is output from position detection unit that detects the actual machining position relative to the machining target position on the workpiece, and
the coefficient is output from coefficient calculation unit that calculates the machining target position output from the laser machine from the actual machining position output from the position detection unit.

3. A laser machine comprising:
the machine learning device according to claim 1;
a scanner head comprising a plurality of galvanometer mirrors for reflection of a laser beam and a plurality of galvanometer motors for driving and rotating corresponding ones of the galvanometer mirrors according to driving control data generated based on a position command indicating a machining target position on a workpiece, and scanning the laser beam over the workpiece;
position command calculation unit that calculates a machining target position on the workpiece;
position detection unit that detects an actual machining position relative to the machining target position on the workpiece;
coefficient calculation unit that calculates a coefficient for a mathematical model for calculating the machining target position to be output from the position command calculation unit, based on the actual machining position output from the position detection unit;
at least two temperature detection units that detect a temperature of at least one galvanometer mirror of the plurality of galvanometer mirrors and a temperature of at least one galvanometer motor of the plurality of galvanometer motors that drives and rotates the at least one galvanometer mirror; and
compensated position command calculation unit that calculates a compensated machining target position for making a match between the machining target position and the actual machining position from the machining target position on the workpiece at at least two detected temperatures detected by the at least two temperature detection units and consisting of the temperature of the at least one galvanometer mirror and the temperature of the at least one galvanometer motor, the compensated position command calculation unit calculating the compensated machining target position by using a mathematical model for calculating the machining target position from the actual machining position relative to the machining target position on the workpiece on the basis of at least two detected temperatures output from the machine learning device and consisting of the temperature of the at least one galvanometer mirror and the temperature of the at least one galvanometer motor, the mathematical model being outputted from the machine learning device that performs supervised learning using training data including input data and a label, the input data containing the temperature of the at least one galvanometer mirror and the temperature of the at least one galvanometer motor, the label being a coefficient for a mathematical model for calculating the machining target position to be output from the position command calculation unit, based on the actual machining position calculated by the coefficient calculation unit at the time of acquisition of the input data.

4. A laser machine comprising:
a scanner head comprising a plurality of galvanometer mirrors for reflection of a laser beam and a plurality of galvanometer motors for driving and rotating corresponding ones of the galvanometer mirrors according to driving control data generated based on a position command indicating a machining target position on a workpiece, and scanning the laser beam over the workpiece;
position command calculation unit that calculates a machining target position on the workpiece;
at least two temperature detection units that detect a temperature of at least one galvanometer mirror of the plurality of galvanometer mirrors and a temperature of least one galvanometer motor of the plurality of galvanometer motors that drives and rotates the at least one galvanometer mirror; and
compensated position command calculation unit that calculates a compensated machining target position for making a match between the machining target position and an actual machining position from the machining target position on the workpiece at at least two detected temperatures detected by the at least two temperature detection units and consisting of the temperature of the least one galvanometer mirror and the temperature of the at least one galvanometer motor, by using a mathematical model acquired through supervised learning using input data and a label, the input data containing at least two detected temperatures consisting of the temperature of the at least one galvanometer mirror and the temperature of the at least one galvanometer motor, the label being a coefficient for calculating the machining target position from the actual machining position relative to the target position of machining with the laser beam on the workpiece, the coefficient being acquired from a coefficient calculation unit before calculation of the machining target position and the actual machining position, the coefficient calculation unit acquiring machining target position data at the time of acquisition of the temperature of the at least one galvanometer mirror and the temperature of the at least one galvanometer motor as the input data by the input data acquisition unit, and concurrently obtaining the coefficient by solving a plurality of mathematical expressions.

5. A laser machining system comprising the machine learning device according to claim 1 and a laser machine,
the laser machine comprising:
a scanner head comprising a plurality of galvanometer mirrors for reflection of a laser beam and a plurality of galvanometer motors for driving and rotating corresponding ones of the galvanometer mirrors according to driving control data generated based on a position command indicating a machining target position on a workpiece, and scanning the laser beam over the workpiece;
position command calculation unit that calculates a machining target position on the workpiece;

position detection unit that detects an actual machining position relative to the machining target position on the workpiece;

coefficient calculation unit that calculates a coefficient for a mathematical model for calculating the machining target position to be output from the position command calculation unit, based on the actual machining position output from the position detection unit;

at least two temperature detection units that detect a temperature of at least one galvanometer mirror of the plurality of galvanometer mirrors and a temperature of at least one galvanometer motor of the plurality of galvanometer motors that drives and rotates the at least one galvanometer mirror; and compensated position command calculation unit that calculates a compensated machining target position for making a match between the machining target position and the actual machining position from the machining target position on the workpiece at at least two detected temperatures detected by the at least two temperature detection units and consisting of the temperature of the at least one galvanometer mirror and the temperature of the at least one galvanometer motor, the compensated position command calculation unit calculating the compensated machining target position by using a mathematical model for calculating the machining target position from the actual machining position relative to the machining target position on the workpiece on the basis of at least two detected temperatures output from the machine learning device and consisting of the temperature of the at least one galvanometer mirror and the temperature of the at least one galvanometer motor, the mathematical model being outputted from the machine learning device that performs supervised learning using training data including input data and a label, the input data containing the temperature of the at least one galvanometer mirror and the temperature of the at least one galvanometer motor, the label being a coefficient for a mathematical model for calculating the machining target position to be output from the position command calculation unit, based on the actual machining position calculated by the coefficient calculation unit at the time of acquisition of the input data.

6. The laser machining system according to claim 5, wherein the machine learning device and the laser machine are connected through a network.

* * * * *